United States Patent [19]
Hartman et al.

[11] Patent Number: 5,587,055
[45] Date of Patent: *Dec. 24, 1996

[54] WATER DISTILLING APPARATUS AND METHOD

[75] Inventors: Michael O. Hartman, 7553 Brazil Rd., Benton, Ark. 72015; Dale J. Kinder, Benton, Ark.; Randy E. Rainey, Conway, Ark.; Arthur R. Helmich; Daniel E. Willis, both of Benton, Ark.

[73] Assignee: Michael O. Hartman, Benton, Ark.

[*] Notice: The term of this patent shall not extend beyond the expiration date of Pat. No. 5,484,510.

[21] Appl. No.: 327,038

[22] Filed: Oct. 21, 1994

Related U.S. Application Data

[63] Continuation-in-part of Ser. No. 143,437, Oct. 26, 1993, Pat. No. 5,484,510.

[51] Int. Cl.$^6$ .................................. B01D 3/42; C02F 1/04
[52] U.S. Cl. ........................................ 203/1; 203/4; 203/10; 203/22; 203/41; 203/86; 203/100; 202/162; 202/176; 202/177; 202/180; 202/181; 202/182; 202/185.3; 202/202; 202/206; 202/234; 202/267.1
[58] Field of Search .................................. 202/176, 177, 202/206, 185.3, 182, 234, 202, 200, 267.1, 162, 181; 203/10, 3, 1, 25, 86, 41, 22, DIG. 17, DIG. 25, 100, 4; 422/26, 291, 298

[56] References Cited

U.S. PATENT DOCUMENTS

| | | | |
|---|---|---|---|
| 2,192,879 | 3/1940 | Brown | 202/206 |
| 3,438,432 | 4/1969 | Wetch et al. | 203/86 |
| 4,140,584 | 2/1979 | Margen | 203/86 |
| 4,316,774 | 2/1982 | Trusch | 203/100 |
| 4,341,601 | 7/1982 | Hartig | 203/26 |
| 4,888,097 | 12/1989 | Palmer | 203/1 |
| 4,894,123 | 1/1990 | Helmich | 202/176 |
| 4,975,154 | 12/1990 | Palmer et al. | 202/206 |
| 5,021,128 | 6/1991 | Palmer | 203/1 |
| 5,110,419 | 5/1992 | Weber et al. | 203/1 |
| 5,484,510 | 1/1996 | Hartman et al. | 202/162 |

*Primary Examiner*—Robert J. Warden
*Assistant Examiner*—Robert Carpenter
*Attorney, Agent, or Firm*—Browning Bushman

[57] ABSTRACT

A water distillation apparatus and method include an improved control system for operation and maintenance, condensers with plastic to metal seals between a plastic condenser manifold and metallic cooling tubes, and a filter with steam bypass to allow for easy sterilization of the filter and remaining distillation system. The control system includes a three pronged probe assembly for monitoring conditions within an evaporation chamber. One of the three probes monitors steam conductivity and provides a steam fault signal to indicate an upper level of contaminants in the steam. A purge pump is responsive to fault signals, including the steam fault signal, to pump water from the evaporation chamber. Improved techniques are also provided for periodically dumping a portion or all of the water in the heating pan to reduce contamination of the system.

22 Claims, 4 Drawing Sheets

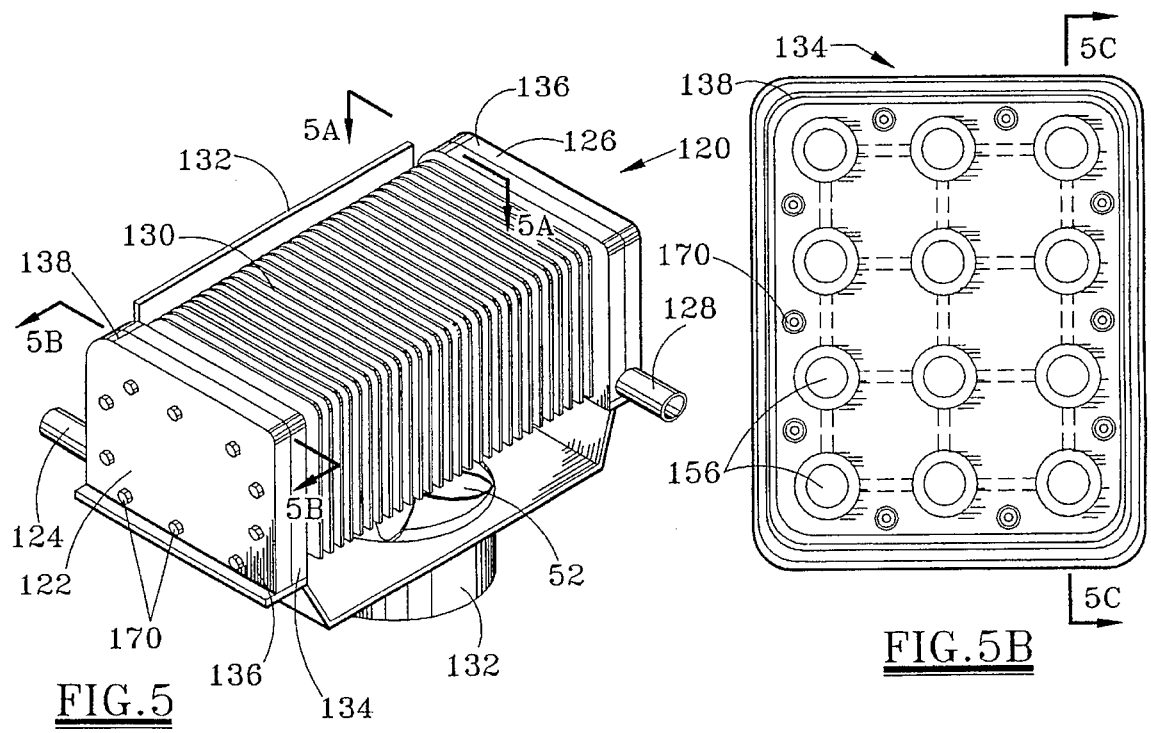
FIG.5
FIG.5B
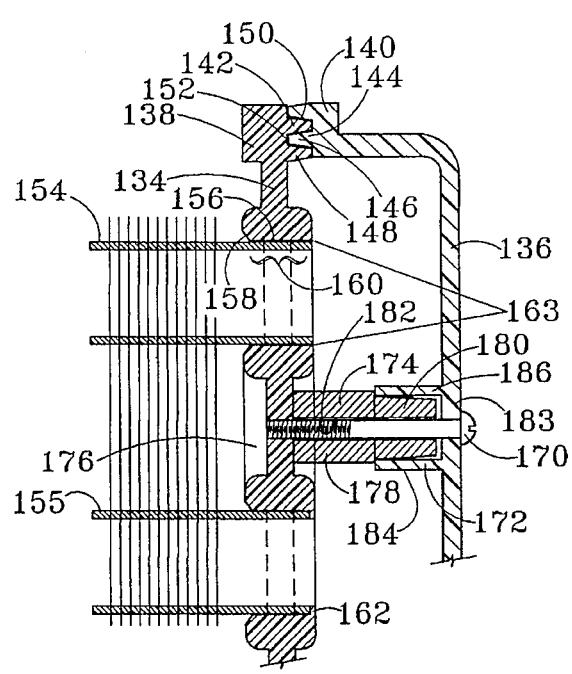
FIG.5A
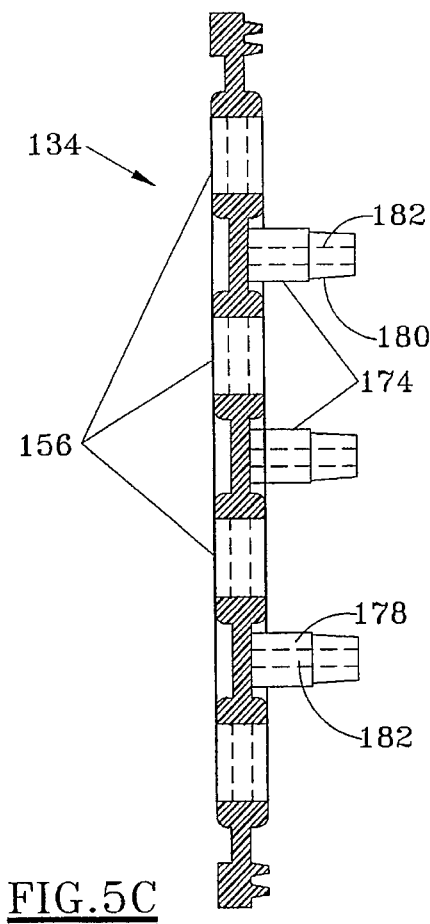
FIG.5C ly 5,587,055

WATER DISTILLING APPARATUS AND METHOD

This application is a continuation-in-part of U.S. Ser. No. 08/143,437, filed Oct. 26, 1993, now U.S. Pat. No. 5,484,510.

FIELD OF THE INVENTION

The present invention relates generally to apparatus and methods for distilling water and, more particularly, to apparatus and methods for improving the efficiency, reliability, and operation of a home or office water distillation unit.

DESCRIPTION OF THE BACKGROUND

In response to newly released health information during the past decade, the public has grown increasingly concerned about contaminants in tap water. Accordingly, there has been an increasing demand for purified water at home and at the work site.

Sources of purified water include bottled water, which typically is delivered regularly at the home or office, and which is generally used with a dispensing system. While bottled water is generally of fair quality, the ongoing costs of water portage are quite high. Also, customers of bottled water are often shocked to learn the contaminant level within the purchased water. Another source of purified water is obtained by filtering tap water. The long term cost of filtering systems is relatively low compared to bottled water, but filtered water quality is typically not high. Many contaminants are not readily removed by filtering. Water distillers for home and office use have been available for quite some time. Distillers are able to provide a water quality at least as high or better than bottled water, although distilled water costs significantly less than bottled water when costs are considered over the reasonable life of the distiller. An article entitled *"Distillation Natures Way of Purifying Water,"* by Jill Coker describes a small distillation unit suitable for home or office use.

The water distillation process heats the water to produce steam, and then condenses the steam to form water free from those contaminants which have a vaporization temperature higher than water. Contaminants having a vaporization temperature lower than water are separated from the steam by venting prior and during the condensation operation. The purified water may then be filtered "polished", if desired. U.S. Pat. No. 4,894,123 disclosed a high efficiency distiller which utilizes a preheat chimney and a low wattage heating coil.

In spite of the many advancements that have been made over the years with home, office, or "end user" water distillers, significant problems still remain. These problems relate largely to the long term use of water distillation units, including ease of operation, long term monitoring of water quality, and automatic self-maintenance of the system in response to such monitoring.

Many prior art distillation units are difficult to clean. While the entire distillation and water storage system may be sterilized with steam, some components within the distiller cannot be intermittently subjected to high temperature steam, and must be removed from the assembly prior to sterilization. Prior art distillation units are typically unable to detect when water quality will drop below a desired level, and accordingly the entire distillation and water storage system becomes contaminated. Other units require the user to partially disassemble the assembly and periodically drain the water from the heater bowl into a pail or other receptacle. Many prior art distillation units are not user friendly, and do not provide the user with sufficient information to reliably operate and periodically clean the assembly.

For long term water quality, corrosion of the flow lines for both the steam and condensed water must be avoided. While electro-polished stainless steel is used in better quality home distillers to avoid corrosion, corrosion remains a problem in components with welded seams, such as the distiller radiator used to cool the steam.

Some municipal or state agencies have enacted or proposed legislation which would prohibit the drainage of the contaminants remaining in the distiller heating bowl into the normal tap water drainage system. Such drainage may be prohibited even though these same contaminants were in the tap water prior to distillation.

Consequently, there remains a need for an end user water distiller that offers dependable operation for long term use with minimum maintenance. Those skilled in the art have long sought and will appreciate the present invention which provides solutions to these and other problems.

SUMMARY OF THE INVENTION

The distillation apparatus of the present invention is operable for purifying incoming water containing contaminants. An inlet valve controls the flow of the incoming water through a preheating chamber, and an evaporation unit heats the incoming water to generate steam. The evaporation unit includes a heating chamber defined by a heating pan for receiving the incoming water and a pan cover. The evaporation unit also includes an electrically powered heating rod for heating the water. A condenser is used to cool the steam and to thereby form water condensate, which is transmitted through an outlet conduit to a water storage tank.

A probe assembly positioned within the evaporation unit includes first, second, and third probes. The first probe is a heater probe for detecting a low water level and is operable for providing a signal to the heating control logic. The second probe is a water probe for detecting a normal boil level in the heating pan and providing a signal to the water control logic, and the third probe is the pan probe for detecting a fault condition in the evaporation unit and for providing a signal to the fault control logic.

The control system for the distillation apparatus preferably includes heating control logic for controlling the heating means, fan control logic for controlling the cooling fan, and fault control logic for detecting fault conditions in the distillation apparatus. The control system includes detecting means responsive to the electrically conductive pan sense probe for detecting the electrical conductivity of the contaminants in the steam within the evaporation unit. The control system further includes comparison means for producing a signal when the electrical conductivity of the contaminant in the steam is compared to a selected electrical conductivity.

The distillation unit preferably includes a filter connected to the outlet conduit from the condenser for filtering the water prior to storage in a water tank. A sterilization switch is provided for initiating a sterilization cycle of the distillation apparatus, during which steam is allowed to flow from the evaporation unit through the water tank. A bypass passageway in the filter assembly allows steam to flow past the filter through the water tank.

The condenser unit for cooling the steam to form water condensate preferably includes plastic material receiving and outlet manifolds for receiving the steam and supplying water condensate to the outlet conduit.

It is an object of the present invention to provide an improved distillation apparatus and method which is more easily serviced by the user.

Another object of the present invention is to provide a control system for measuring and controlling contaminants in the steam generated by a distillation unit.

Another object of the present invention is to provide means for sterilizing the distillation system without removing filters downstream of the condensing unit.

Yet another object of the present invention is to provide a distillation assembly which has minimal welds engaging the water or steam.

Still another object of the invention is an improved method of operating a distillation unit, and particularly for intermittently sterilizing the distillation unit components. A further object of this invention involves a technique for flushing a portion of the water in a distillation unit heating bowl in response to the measured level of total dissolved solids in the water within the heating bowl.

A feature of the present invention is the means for measuring contaminants within the steam while still within the evaporation unit.

Yet another feature of the present invention is an auto-clean pump, automatically operable in response to system detectors, for removing or filtering water in the evaporation unit.

A further feature of this invention relates to the positioning and operation of probes to increase the reliability of probes in a distillation assembly.

An advantage of the present invention is a water distillation system that is simple to operate, and may be safely and reliably cleaned.

Another advantage of the present invention is a system that performs most distillation maintenance automatically in response to its own detectors.

Another advantage of the present invention is a reasonably compact distillation control system which operates to provide reliable assurance of purified water quality.

A significant advantage of the invention is that the heating bowl, the steam passage and the holding tank may remain sterilized for an extended period of time prior to refilling the heating bowl with incoming water.

These and further objects, features, and advantages of the present invention will become apparent from the drawings, the descriptions given herein, and the appended claims.

BRIEF DESCRIPTION OF THE DRAWINGS

FIG. 5 is a pictorial view of a radiator in accord with the present invention;

FIG. 5A is an elevational view, in cross-section, of a manifold for the radiator shown in FIG. 5;

FIG. 5B is an elevational view, along the lines B—B of FIG. 5; and

FIG. 5C is an elevational view, in cross-section, along the lines C—C of FIG. 5B.

While the present invention will be described in connection with presently preferred embodiments, it will be understood that it is not intended to limit the invention to those embodiments. On the contrary, it is intended to cover all alternatives, modifications, and equivalents included within the spirit of the invention and as defined in the appended claims.

DETAILED DESCRIPTION OF PREFERRED EMBODIMENTS

Figure 1:
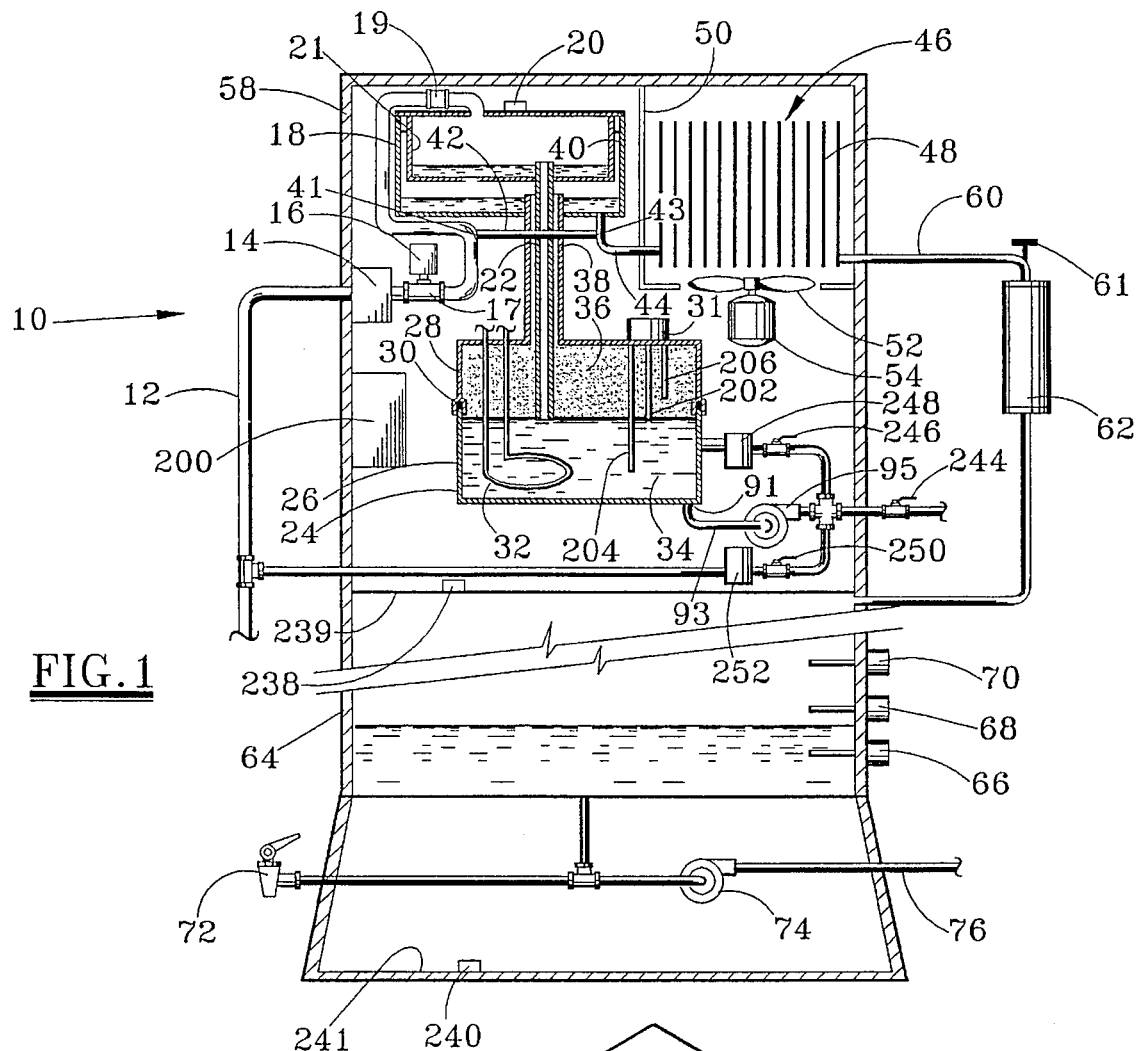
FIG. 1 is an elevational view, partially in cross-section, of a distillation apparatus in accord with the present invention.
Figure 2:
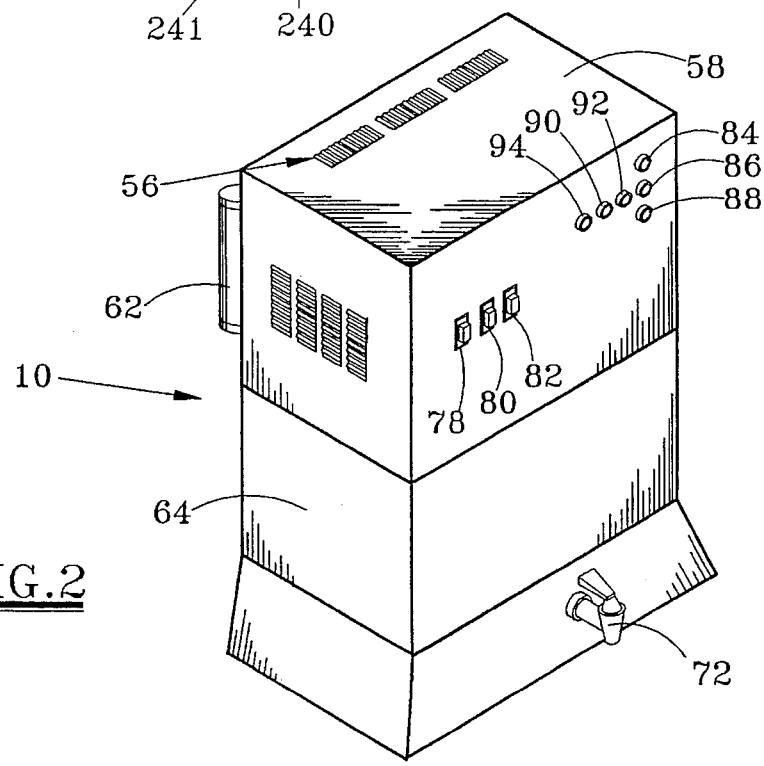
FIG. 2 is a pictorial view of the distillation apparatus of FIG. 1.

Referring now to the drawings, and more particularly to FIG. 1 and FIG. 2, a preferred embodiment of the overall configuration of distillation apparatus 10 of the present invention is disclosed. Water containing contaminants enters distillation apparatus 10 through line 12. Line 12 may include a line water filter (not shown) and may also include a control valve (not shown) for turning on or off the flow of water to the distiller.

The pressure of water entering distillation apparatus 10 is regulated and reduced by regulator 14. Water inlet valve 17 includes valve actuator 16 for controlling water flow (not shown) may be into distillation apparatus 10. A small orifice restricter 19 is used to reduce water flow and provide back pressure to regulator 14 for stability. In one preferred embodiment as discussed hereinafter, regulator 14 is eliminated by operating water inlet valve in short duration pulses to control water flow. Water inlet valve 17 opens to allow water flow into preheater 18. Preheater 18 is designed to increase the distillation efficiency, as described more fully in U.S. Pat. No. 4,894,123 which is incorporated herein by reference. Fault sensor 20 monitors preheater 18 for a fault condition indicated by water on top of preheater 18 which should be dry during normal operation.

After entering preheating bowl 21 within preheater 18, water overflows through inner conduit 22 to evaporation unit 24. Evaporation unit 24 includes heater pan 26 and pan lid 28, which are preferably mated at O-ring seal 30 to define a gas-tight heating chamber. Probe apparatus 31, to be discussed in detail hereinafter, monitors conditions within evaporation unit 24. Heating element 32 is used to heat water 34, which contains contaminants, to form steam 36. While heating element 32 is preferably electric, the present invention could be designed to work with alternate heating sources.

Steam 36 proceeds through outer tube 38 to steam bowl 40. It will be appreciated that steam 36 is used for pre-heating incoming water, and that incoming water is used to pre-cool steam 36. Accordingly, the efficiency of the distillation operation is increased by this configuration. Further details with respect to the general structure of the assembly as discussed above is included in U.S. Pat. No. 4,894,123.

Increased pre-heating and pre-cooling may be obtained using thermoelectric module 42. Such modules may produce, for instance, a 70° temperature differential across its ends 41 and 43. Thus, module 42 provides entering water with enhanced pre-heating and exiting steam with enhanced pre-cooling. The electricity powered module 42 may be located in other places than indicated in FIG. 1, but is preferably disposed where it can effectively perform simultaneous heating and cooling.

Steam and condensate water exits steam bowl 40 through conduit 44 for additional cooling in condenser 46. Condenser unit 46, to be discussed in greater detail hereinafter, preferably includes a plurality of cooling fins 48, fan shroud 50, fan blade 52, and fan motor 54. Air vents 56 (FIG. 2) allow air into and out of housing 58 of water distillation apparatus 10 for passing by the fins 48.

Condensed water flows out of condenser unit 46 through outlet conduit 60, and is preferably filtered with filter 62 before being stored in distilled water tank 64. Charcoal filtering, while not necessary, may add a desirable amount of taste (polishing) to the distilled water. While filter 62 is shown as being mounted outside enclosure 58, it could easily be mounted inside the enclosure.

Water tank 64 may be provided in various sizes. It is preferably formed with stainless steel, but could be formed from glass, plastic or other materials suitable for containing distilled water. Probes 66, 68, and 70 monitor conditions within water tank 64 in a manner to be discussed hereinafter. Water may be obtained from water tank 64 through spigot 72 or by powering demand pump 74. Two spigots, such as spigot 72, could be used to provide cold and hot water, if desired. Demand pump 74 transfers water to a location remote from apparatus 10, e.g., ice maker or refrigerator. Demand pump 74 senses reduced water pressure in demand conduit 76, and pumps automatically in response to a pressure drop which may occur, for instance, when a remote water valve (not shown) is opened at the end of the conduit 76.

The controls for distiller 10 are designed to be uncomplicated and user friendly. Switch 78 is an on-off power switch. Switch 82 is a sterilization switch for automatically steam sterilizing the distillation apparatus. Switch 80 is a low-high power switch which allows for less energy usage if demand for water is not great enough to warrant full power. Low power is also preferably used to compensate for turbulent incoming water conditions.

Status indicator lights or other conventional communicating devices allow for readily ascertaining the operation status of distiller 10. Respective lights 84, 86, and 88 are preferably used to indicate the approximate level of water in water tank 64 in terms of full, half full, and low. Light 90 is used to indicate inlet valve operation to show when water is entering the system. Light 92 signals when heater 32 is operating. Light 94 may be used to indicate when cleaning of the system may be necessary, and/or to indicate when the total dissolved solids (TDS) of water condensate in the tank is too high. After emptying water tank 64 and leaving spigot 72-open, cleaning may be accomplished by activating the sterilization switch. To insure the highest water quality, contaminants in the generated steam are continuously monitored so that if the quality becomes less than a preselected quality, the end user is alerted. More specifically if the unit produces other than distilled water (defined herein as less than 10 parts per million total dissolved solids), apparatus 10 will provide a warning and/or initiate procedures for correcting the problem and preventing operation of the distiller until the problem is corrected.

The response of apparatus 10 is preferably automatic for cleaning/emptying certain components of the system. For instance, autoclean pump 95 may be activated to remove water from evaporation unit 24 in response to an indication of an undesirably high level of contaminants in steam 36, or in response to other fault conditions, such as water overfill, as discussed hereinafter in connection with the distillation control system shown in FIG. 3.

Figure 4:
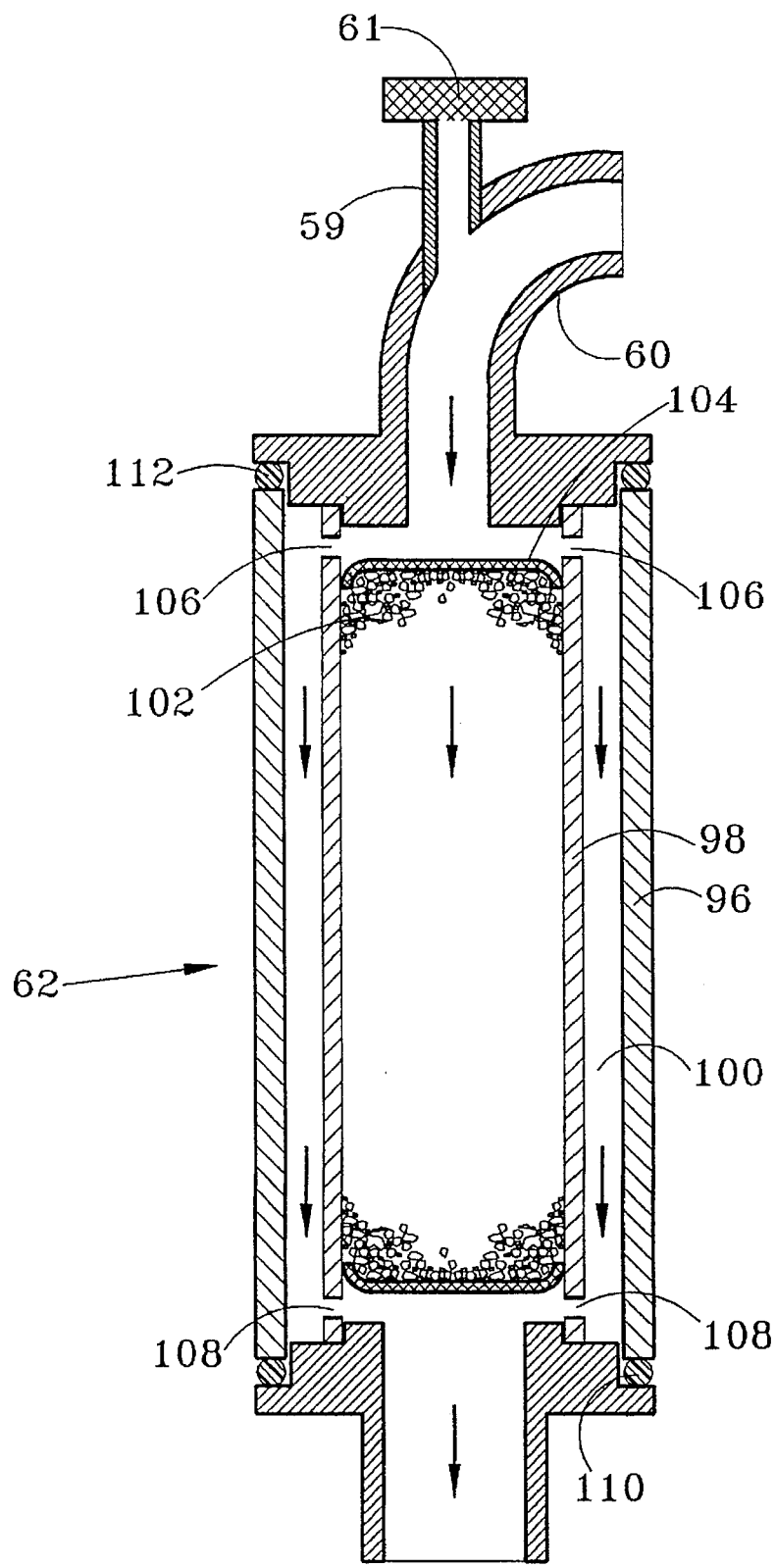
FIG. 4 is an elevational view, in cross-section, of a filter assembly positioned downstream from the distillation condenser.

FIG. 4 provides a cross-sectional view of filter assembly 62 generally shown also in FIG. 1 and FIG. 2. A vent 59 is preferably provided with a 0.2 micron filter 61 for venting vapor gas immediately upstream from the filter assembly, and for prevention of airlock within the water tank. A similar vent and 0.2 micron filter (not shown) are provided in water tank 64. Steam jacket 96 and filter container 98 define steam annulus 100 therebetween. During the sterilization cycle, steam flows through conduit 60 and enters charcoal filter 102 through screen 104. Because a charcoal filter normally acts as a significant impediment to the steam flow (which is not under significant pressure), the charcoal filter in prior art distillation systems customarily is removed prior to sterilization. According to the present invention, apertures 106 allow steam to flow into annulus 100. From annulus 100, steam is allowed to flow past charcoal filter 102 and into return apertures 108 through water tank 64 for sterilization of water tank 64. The steam flow through and surrounding charcoal filter 102 thus heats and sterilizes filter 102 to kill bacteria. Accordingly, there is no need to remove the filter during the sterilization cycle. By passing around rather than through the charcoal filter, steam is quickly transmitted to downstream components, such as tank 64, to reduce the overall time required for sterilization. Tests indicate that by the time steam reaches open spigot 72, the interior of filter 102 is heated by steam to a temperature desired for sterilization. This makes system sterilization a simple matter requiring little more than draining water tank 64, opening spigot 72, and pressing switch 82. As will be appreciated, upper and lower O-rings 110 and 112 seal steam jacket 96 from the atmosphere. The specially designed filter assembly 62 increases the ease of operation and maintenance of distillation apparatus 10.

FIG. 5–FIG. 5C discloses details of condenser unit 46 shown in FIG. 1 and, more specifically, radiator 120. Radiator 120 includes steam receiving manifold 122 with steam inlet 124. On the opposite side is outlet manifold 126 with condensate outlet 128. Metal cooling fins 130 are used to cool the metal evaporator tubes (twelve in a preferred embodiment) extending between receiving manifold 122 and outlet manifold 126. Shroud 132 directs air from fan 52.

Due to the problem of corrosion at welds, manifolds 122 and 126 are preferably formed from plastic. However, the use of plastic components for the radiator presents a problem of potential leaks or, in the alternative, multi-component seals include metal-plastic and plastic-plastic seals. The presently preferred embodiment requires only two manifold components apart from securing members, i.e., the radiator end plate 134 and radiator end housing 136, for each of the receiving manifold and the outlet manifold.

Referring to FIG. 5A, end plate 134 and end housing 136 are sealed along their outer respective peripheries 138 and 140 with multi-fingered sealing elements 142 and 144. The individual fingers, such as fingers 146 and 148 are offset from each other and tapered to allow meshing. The fingers thus all preferably have a sloping sealing surface, such as surface 150. The slope is preferably in the range of about 3° to 5°. End walls, such as end wall 152, act to complete the seal along the peripheries 138 and 140.

Cooling tubes, such as cooling tube 154 and 155, are each inserted into apertures 154 in end plate 134, and sealed to end plate 134 by cold forming a seal as the cooling tube is pushed into the aperture. Condensing tube 155 is positioned just prior to cold forming the seal. Aperture 156 includes a chamfered entry portion 158. Most of the remainder portion 160 of aperture 156 is preferably of a constant cylindrical diameter. Preferably, at the end of aperture 156 is a radially inwardly directed annular lip 162, which when deformed by the tube completes the seal. Prior to cold forming of a seal (as shown with condensing tube 155), lip 162 thus has a diameter slightly smaller than that of portion 160 by about one-hundredth of an inch in the presently preferred embodiment. The axial length of lip 162, with respect to the axis of aperture 156, is much smaller than the axial length of the aperture 156, and preferably in the range of about 15 times smaller. As cooling tube 154 is pushed into aperture 156, lip 162 deforms and forms seal bead 163 around cooling tube 154. Thus, a reliable metal to plastic seal is inexpensively formed. This metal to plastic seal reliably seals steam within the condenser, and need not seal against steam under any substantial pressure. While lip 162 is shown at the exit of aperture 156, it could be located elsewhere along the axial length of aperture 156. Typical tolerances for these components may be about plus or minus five thousandths of an inch. In a presently preferred embodiment, the radiator utilizes twelve cooling tubes so that twelve apertures 156 within each of the sealing manifold and the outlet manifold are cold formed to mate with twelve cooling tubes.

Screws, such as screw 170, may be used to hold end housing 136 to end plate 134. In a preferred embodiment, ten screws 170 are used, although the number of screws may be varied so long as the plates are securely fastened with respect to each other. Sleeve-shaped box protuberances 172 on the end housing 136 engage pin protuberances 174 on the end plate 134, thereby sealing the interior of each manifold from screw 170. The pin protuberances include a cylindrical portion 178 having a constant diameter, and a slightly decreasing diameter frustoconical portion 180 with about a 2° draft. The figures over-emphasize the draft for explanatory purposes. A screw aperture 182 extends through pin protuberance 174.

Box protuberance 172 is thus designed to sealingly receive pin protuberance 174, and provides for an extension of aperture 182 through end wall 183. Box protuberance 172 includes a substantially constant diameter outer surface 184. The inner surface 186 of box protuberance 172 also has about a 2° draft to mate with that of pin protuberance.

Radiator 120 thus has plastic material manifolds which provide an economical plastic to plastic sealing connection between the plastic radiator end plate 134 and plastic end housing 136. Radiator end plate 134 provides a weld-free plastic to metal connection between cooling tubes 154 and end housing 136. The elimination of welds greatly increases the lifetime and reliability of operation of distillation apparatus 10. The manifolds of the radiator serve an important purpose in efficient cooling the steam, as disclosed in U.S. Pat. No. 4,894,123.

Figure 3:
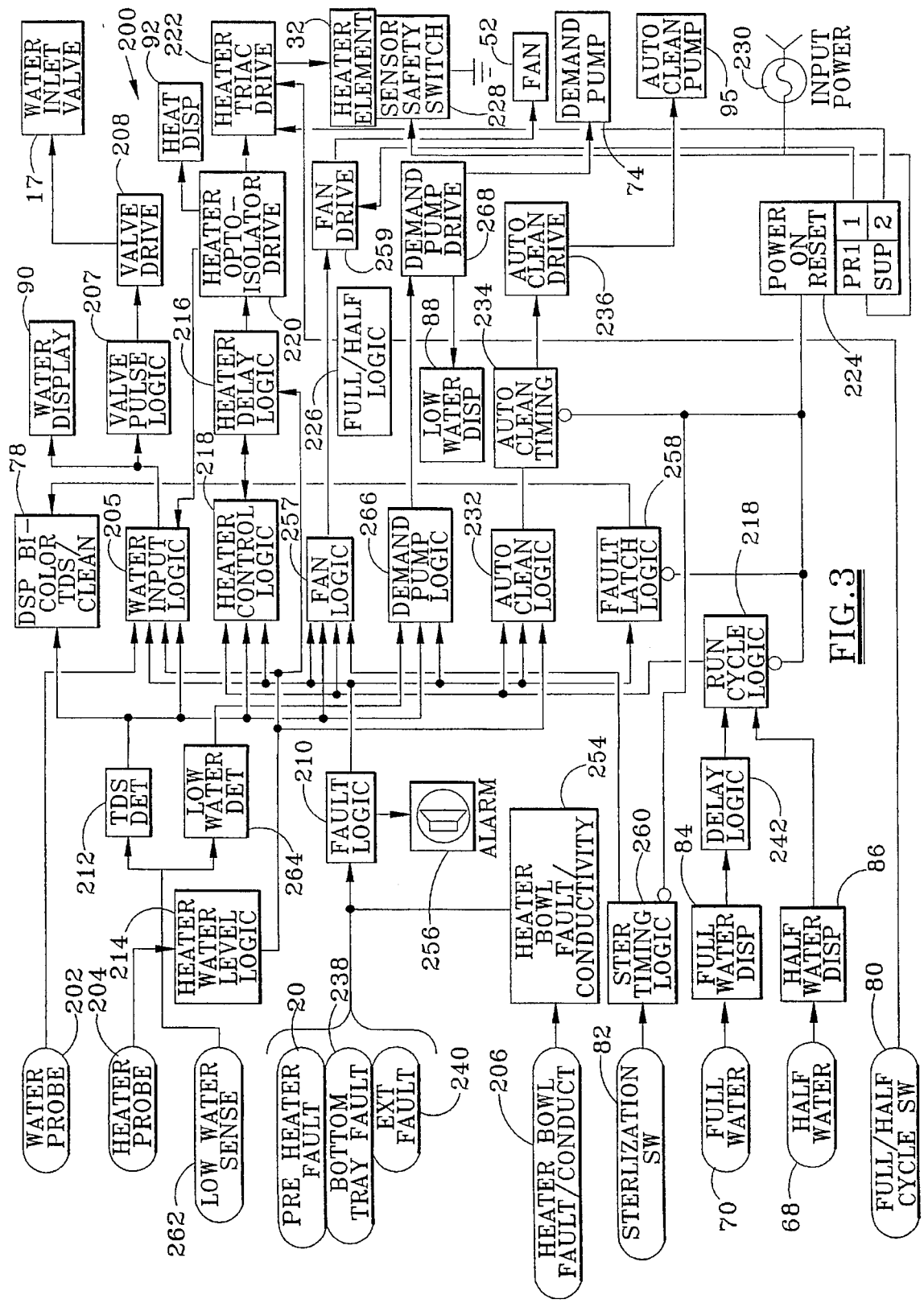
FIG. 3 is a schematic diagram of a control system for a distillation apparatus in accord with the present invention.

Referring now to FIG. 3, there is shown schematically the overall control system 200 for distilling apparatus 10. Evaporation unit probe assembly 31, shown in FIG. 1, includes water probe 202, heater probe 204, and heater bowl (pan) fault/conductivity probe 206. Each probe is electrically conductive, and preferably made of titanium or other inert material for long life.

Water probe 202 detects and is used to control the normal boil level in heater pan 26. If the water level drops vertically below water probe 202, then the water input logic 205 produces a signal and applies it to valve pulse logic 207 and also activates water display 90. Valve pulse logic 207 may be designed to produce very short pulses for rapidly opening and closing water inlet valve 17 to thereby control incoming water without the need for pressure regulator 14. In this manner, it is possible to eliminate the relatively expensive pressure regulator 14 since the rapid opening and closing of inlet valve prevents high pressure water flow into apparatus 10. If pressure regulator 14 is used, then inlet valve 17 may be held open until water input logic determines that inlet valve 17 should be closed. Valve pulse logic 207 operates inlet valve 17 through valve drive 208. If a fault is detected by water input logic 204, either from fault logic 210 or TDS detector 212 as discussed hereinafter, then the inlet valve 17 is closed until the problem is corrected.

Heater probe 204 effectively starts the distillation operation. Heater probe 204 also prevents operation of heater 32 until there is adequate level of water in heating pan 26. The heater water level logic 214 receives the signal from heater probe 204 and provides a signal to heater delay logic 216. Heater delay logic 216 receives a status signal from heater control logic 218. The status signal is developed from fault logic 210, TDS detector 212, and run cycle logic. Heater delay logic 216 then signals heater opto-isolator drive 220 to either turn on or turn off the heater triac drive 222 which provides power to heater element 32. Heater delay logic 216 also turns on light 92 when heater element 32 is on. Triac drive 222 receives heater element power from primary no. 2 of power supply 224.

Full/Half power switch 80 controls full/half logic 226 to regulate whether heater triac drive should use a 50% or a 100% duty cycle for heater element 32. Sensor safety switch 228 monitors temperature near heater element 32 and is normally open. If over heating occurs, sensor safety switch 228 closes, thereby shorting power to ground, blowing fuse 230, and removing power to heating element 32.

Autoclean logic 232 receives status input signals from heater water level logic 214, fault logic 210, and run cycle logic 218. Depending on these status input signals, autoclean logic 232 sends a signal to autoclean timing logic 234 which activates, for a specific time period, the autoclean pump 95 through autoclean drive 236. Autoclean pump 95 may be activated to remove or purge heating pan 26 for numerous reasons. If preheater fault probe 20, bottom tray fault probe 238, or external fault probe 240 detect a fault, then autoclean pump 95 is activated. All three of these fault probes thus detect water in a place where water should not be found. For example, there should be no water along bottom tray 239 (see FIG. 1) of apparatus 10, so that bottom tray fault probe 238 would not normally be activated. Similarly, no water should exist on plate 241 for detective by external fault probe 240.

If the generated steam 36 becomes overly contaminated, or if the level of water rises too high in heater bowl 26, or if excessive bubbling is detected in heater bowl 26, the pan probe 206 will sense this condition, and the autoclean pump is activated. The autoclean pump may also be activated in response from full water probe 70. Status signals also include an active signal from heater probe 204 for the purpose of being sure water is in the heating pan so that the autoclean pump 95 will not run dry, and from delay logic 242 for the purpose of delaying shutoff of apparatus 10 when the tank 64 is full, while still compensating for water contraction upon cooling to keep full light 84 on.

Autoclean pump is mainly used to remove the water inside heating pan 26 which collects the contaminants from the incoming water, so that fresh water can thereafter be added to the pan. Thus, at times selected as described in connection with the status signals received from full water probe 70, heater probe 204, or the several fault probes 20, 206, 238, and 240, autoclean pump is activated to remove water from heating pan 26.

Autoclean pump connects to pan 26 through conduit 93 at outlet 91 in the bottom of pan 26. The water from heating pan 26 may be drained to several locations, and preferably autoclean pump 95 drains into a standard water drainage pipe (not shown). This function may be performed by opening valve 244 which leads to a drainage pipe and activate the pump 95. However, due to local regulations, emptying heating pan 26 into a standard drain may not be permitted. In this case, two further options are possible. Valve 246 may be opened to allow water to be circulated back to heating pan 26 after being filtering through filter 248. Alternatively, valve 250 may be opened to allow water to flow back to water inlet line 12 after filtering through filter 252. Thus, distillation apparatus 10 may be used in locations which may severely restrict water drainage.

Fault logic 210 senses and controls operation of distillation apparatus 10 when a fault is detected. Such a fault would include a fault from heater bowl (pan) probe 206. Probe 206 provides fault information in several circumstances. Probe 206 detects the conductivity of steam generated in heating pan 26. If the steam generated contains too many contaminants, as is especially likely if the water in heating pan 26 collects a high level of contaminants, then a fault signal is produced and various actions are taken by control system 200 as described hereinbefore. Another function of pan probe 206 is to detect an excessively high level of water in heating pan 26. This might occur, for instance, if water probe 202 or related circuitry fail. Pan probe 206 also detects excessive bubbling in heating pan 26 caused by boiling water. Excessive bubbling or boiling is undesirable, because of decreased efficiency of operation. Bubbling will be reduced by activating switch 80 to a reduce power to, for example, one-half of full power, although less distilled water will then be produced. Heater bowl fault/conductivity logic 254 contains comparing means for comparing detected generated steam conductivity with a selected value of steam conductivity, which may represent an upper limit of contaminants in the generated steam. Thus, the problem may be cleared by automatically flushing heating pan 26 before such contaminants reach water tank 64. TDS (total dissolved solids) are also monitored in water tank 64 as discussed hereinafter.

Other fault information received by fault logic 210 includes a fault indicated by detection of water in places that water should not be found. Water sensors 20, 238, and 240, respectfully, detect water adjacent preheater 18, bottom tray 239, or along plate 241. Such sensors may be located wherever desired to detect faulty operation which may be indicated by water.

Fault signals to fault logic 210 produce several results: changing of display status, water input logic 205 preventing operation of water inlet valve 16, heater control logic 218 preventing operation of heater element 32, fan logic 257 preventing operation of fan 52 through fan drive 259, audio alarm 256 activation, a status signal to autoclean logic 232, and a signal for fault latch logic 258 to latch.

Sterilization switch 82 provides a means for sterilizing the water flow path through distillation apparatus 10 with steam. When sterilization is warranted, as indicated by status signals or as routine maintenance, then sterilization switch 82 activates sterilization timing logic 260. Once timing logic 260 is activated, fan logic 257 turns off fan 52. Thus, hot steam is produced and is allowed to flow through condensing unit 46 to water tank 64. Water is drained from tank 64 prior to sterilization and spigot 72 is left open. The hot steam eventually begins coming out of spigot 72 to indicate sterilization is complete. Sterilization timing logic 260 limits the amount of time of steaming to prevent accidental operation of the steam switch. Typically timing logic 260 stops sterilization after about two minutes. If sterilization is not yet complete, switch 82 may be activated again for another sterilization cycle.

Low water sense probe 262 detects the level of water in water tank 64 and also senses the condition of the water. TDS detector 212 is used to determine from low water sense probe 262 if the level of total dissolved solids in water tank 64 becomes greater than 10 parts per million. Above that amount, the water is no longer considered to be distilled water. Low water sense probe 262 also detects the level of water in water tank 64 using low water detector logic 264. If either TDS detector 212 or low water detector 264 is de-activated, then demand pump logic 266 receives a status signal to prevent operation of demand pump 74 through demand pump drive 268. If low water is the cause, then low water display 88 is de-activated. If the TDS detector detects too many contaminants, then a signal is sent to activate TDS/Clean display 78, to prevent incoming water via water input logic 204, to shut off heating element 32 via heater control logic 218, to turn off fan 52 through fan control logic 257, and the de-activated demand pump 95.

In order to reset fault conditions as discussed hereinbefore, a power-on reset signal is provided from power supply 224. A power-on reset signal goes to run cycle logic 218, fault latch logic 258, and autoclean timing 234.

Those skilled in the art will appreciate from the above that improved techniques provided for purifying incoming water to a distillation evaporator unit having a heating pan and a filter within a flow line interconnecting a condenser unit and a water storage tank. This technique includes periodically initiating a sterilization cycle so that steam flows from the evaporator unit to the heating tank. During the sterilization cycle, a steam passageway in communication with the outlet flow line from the condenser provides a flow path in parallel with a filter to transmit steam through the steam passageway, through the filter, into the water tank.

The system as described above includes a probe for measuring the total dissolved solids (TDS) level in the water within the heating bowl. According to an improved technique of the present invention, when the TDS level reaches a predetermined level, a portion of the water in the heating bowl is bypassed to the drain, thereby allowing new water to enter the heating bowl and inherently lowering the TDS level. The amount of water periodically dumped from the heating bowl (as a function of a completely full water bowl) may vary, although it is preferred that this process release from 3% to 15%, and preferably from 5% to 10%, of the 100% full volume of water in the heating bowl each time the system is "partially flushed" in this cleansing operation. This technique significantly reduces overall contamination in the system by maintaining an acceptable TDS level within the water in the heating bowl, and may be particularly suitable for systems wherein the incoming water to the distillation system has a high TDS level. Accordingly, the probe assembly 31 may measure the TDS level in the water in the bowl or pan 26, and the valve 244 opened and the pump activated 95 for a selected period of time to flush from 5% to 10% of the water from the bowl. During this brief flushing operation, the computer may automatically ensure that the heating elements remain off.

It has also been learned that the probe design as described above may result in false signals from error due to the continual charging of the probe assembly 31 by catalytic action. These false probe readings will generate false signals which may adversely affect the operation of the distillation assembly. According to an improved technique, when the water level reaches the uppermost tank probe 70, the heating unit shuts off and dumps water from the heating pan. Although the heating pan water level is below probe assembly 31, power may remain on to the heating elements so that the entire system downstream from the heating pan is effectively sterilized. During this system sterilization period when the probes are not emersed in water, the probes are also "cleaned" in the sense that contaminates on the probe are reduced, thereby significantly extending the life and reliability of the probes. During this period when the probes are not in the water, no contaminates are allowed in the sterilized distillation flow system. Displaced air enters the distillation flow system from the heating pan and could extend to the water holding tank without contaminating the system in a manner which would occur if the pan were immediately filled with water after the pan is fully dumped or flushed, as described above. Again, this technique leaves the system sterilized during the probe cleaning operation, thereby extending the life of the distillation assembly.

The process of sterilizing the system as described above practically requires that any water remaining in the heating bowl be heated to about 212° F. for a period of at least two minutes to kill bacteria. While the heater is temporarily activated to achieve this sterilization, the water remaining in the heating bowl or pan may result in the heating element being exposed to air, being partially submerged in water, or being fully submerged in water. Activation of the heating element may be controlled to ensure that the heating element does not burn out during this sterilization cycle. As a result of dumping water from the heating bowl and preventing the flow of incoming water while the heating element is activated, the interior of the heating bowl is not lowered to a temperature of significantly less than 212° F., and accordingly, the system is sterilized by maintaining the interior of the heating bowl at substantially 212° F. for the required two minute time period.

The process as described above of periodically draining water from the pan and preventing possible microbiological contaminates from entering the distillation flow system by way of the inlet water valve 16 actually serves two purposes. First, if pan 26 were to be filled with water immediately after the pan is dumped or flushed, microbiological contaminates would be drawn into the holding tank 64 by way of the radiator assembly 46 and charcoal filter assembly 62 since the pressure in the holding tank 64 lowers as the tanks 64 cools down after the distillation assembly is shut down when completely filling the holding tank 64. As explained above, this system contamination is eliminated (or significantly reduced) by intentionally delaying the refilling of the heating pan. The second purpose served by that process is to reduce electrical property changes of the probe assembly 31. Effects of the ion action of carbonates and bicarbonates of calcium and magnesium on the probes are significantly reduced and, in fact, reversed when the probes are removed from contaminated water for a period of time and not allowed to exchange or deposit ions on the probe surfaces, thereby changing the dielectric properties of the probes.

It should be noted that in the prior discussion of the probes, it may be more proper to refer to electrical impedance rather than electrical conductivity because of the dielectric properties of the water and steam acting on the probes. Microprocessors allow for biasing of the probes and the reliability of the probes may be enhanced through a dynamic reading process, thereby again enhancing the distillation system.

The foregoing disclosure and description of the invention is illustrative and explanatory thereof, and it will be appreciated by those skilled in the art, that various changes in the size, shape and materials as well as in the details of the illustrated construction or combinations of features of the various coring elements may be made without departing from the spirit of the invention.

What is claimed is:

1. A distillation apparatus for purifying incoming water containing contaminants, comprising:

an inlet valve along an inlet line for controlling the flow of said incoming water;

an evaporation unit for heating said incoming water to generate steam, said evaporation unit including a heating chamber therein defined by a heating pan for receiving said incoming water and producing said generated steam, and a heating means;

a condenser unit for receiving generated steam from the evaporation unit and cooling said steam to form water condensate;

an outlet conduit for said water condensate;

a purge pump for removing water from said heating pan through a pan outlet disposed adjacent a bottom portion of said heating pan;

a probe assembly including a total dissolved solids probe within said heating pan for measuring total dissolved solids values in the heating pan; and a control system including a comparator responsive to the total dissolved solids probe for comparing the total dissolved solids in the water to a selected value, and for activating the purge pump in response to the comparator to partially flush the heating pan.

2. The apparatus of claim 1, wherein said control system periodically activates the purge pump to flush from 5% to 15% of the water within the heating pan.

3. The apparatus of claim 1, wherein:

the probe assembly includes an electrically conductive pan sense probe positioned within said evaporation unit heating chamber for contact with said generated steam; and the control system includes detecting means responsive to the probe assembly for detecting an electrical conductivity of said generated steam within said evaporation unit, said control system further including comparison means for producing a signal when said electrical conductivity of said generated steam is compared to a selected electrical conductivity.

4. The apparatus of claim 3, wherein:

said control system comparison means is operative to produce a high water level fault signal when said pan probe contacts a water level of said incoming water in said heating pan.

5. The distillation apparatus of claim 3, wherein:

said comparison means is operable to produce a normal status signal when said detected electrical conductivity of said generated steam becomes less than said selected electrical conductivity, said control system further including water input logic responsive to said normal status signal, said water input logic allowing operation of said inlet valve; and said control system including heater control logic allowing operation of said heating means.

6. The distillation apparatus of claim 1, further comprising:

a water filter in fluid communication with said pan outlet for filtering water removed from said heating pan with said purge pump.

7. The distillation apparatus of claim 1, further comprising:
a thermoelectric cooling module having first and second ends, said first end having a higher temperature than said second end, said first end contacting said incoming water for preheating said incoming water, said second end contacting said steam from said evaporation unit for precooling said steam.

8. The distillation apparatus as defined in claim 1, further comprising:
a filter positioned along the outlet conduit from the condenser unit; and
a steam passageway in communication with the outlet conduit and in parallel with the filter to transmit steam through the steam passageway.

9. The distillation apparatus as defined in claim 8, wherein the steam passageway is an annular chamber surrounding the filter for heating the filter with steam flowing in parallel with the filter.

10. A distillation apparatus for purifying incoming water containing contaminants, comprising:
an inlet valve along an inlet line for controlling the flow of said incoming water;
an evaporation unit for heating said incoming water to generate steam, said evaporation unit including a heating pan for receiving said incoming water and producing said generated steam, and a heating means;
a condenser unit for receiving generated steam from the evaporation unit and cooling said steam to form water condensate;
an outlet conduit for said water condensate;
a purge pump for removing water from said heating pan through a pan outlet disposed adjacent a bottom portion of said heating pan;
a probe assembly including first, second and third electrically conductive probes, the first probe being a heater probe for detecting a low water level in said evaporation unit and operable for providing a signal to the heating means, the second probe being a water probe operable for detecting a normal water level in said evaporation unit, and the third probe being a fault probe operable for detecting a fault condition indication of impurities in said steam within said evaporation unit, the probe assembly further including a total dissolved solids probe within the heating pan for measuring total dissolved solids values in the water in the heating pan; and
a control system including a comparator responsive to the total dissolved solids probe for comparing the total dissolved solids in the water to a selected value, and for activating the purge pump in response to the comparator to partially flush the heating pan.

11. The distillation apparatus as defined in claim 10, wherein the control system automatically activates the purge pump to discharge from 5% to 15% of the water within the heating pan in response to the TDS detector.

12. The distillation apparatus as defined in claim 10, further comprising:
a water control circuit for regulating the inlet valve;
a fault control circuit for detecting fault conditions in the distillation apparatus and signalling the heating means and the water control circuit;
the second probe providing a signal to the water control circuit; and
the third probe providing a signal to the fault control circuit.

13. A method of operating a water distillation unit, the method comprising:
providing an evaporation unit and a heating pan to purify incoming water containing contaminates;
inputting incoming water to the heating pan;
heating the incoming water within the heating pan to generate steam;
cooling the steam within a condenser unit to form water condensate;
positioning a total dissolved solids probe within the heating pan for measuring total dissolved solid values in the water in the heating pan;
comparing a signal from the total dissolved solids probe to a predetermined total dissolved solids level and generating an activation signal when the measured total dissolved solids exceeds a predetermined value; and
partially flushing water from the heating pan to lower the total dissolved solids content of the water in the heating pan in response to the activation signal.

14. A method as defined in claim 13, wherein the step of partially flushing includes discharging from 3% to 15% of the water within the heating pan in response to the activation signal.

15. The method as defined in claim 13, further comprising:
providing a filter along an outlet flow line from the condenser unit to a water tank for receiving said water condensate; and
providing a steam passageway in communication with the outlet flow line and in parallel with the filter to transmit steam through the steam passageway to the water tank.

16. The method as defined in claim 15, further comprising:
forming the steam passageway as an annular chamber surrounding the filter for heating the filter with steam flowing in parallel with the filter.

17. The method as defined in claim 15, further comprising:
powering a fan for passing air by the condenser unit;
deactivating the fan while steam is periodically passed to the water tank; and
automatically limiting the time while steam is passed to the water tank.

18. The method as defined in claim 13, further comprising:
continuing to activate a heating member within the heating pan while partially flushing water from the heating pan.

19. The method as defined in claim 13, further comprising:
positioning a probe assembly within the heating pan for controlling operation of the water distillation unit; and
temporarily maintaining at least one probe of the probe assembly out of engagement with the water while activating a heating member within the heating pan to reduce contaminates on the at least one probe and thereby enhance the reliability of the at least one probe.

20. The method as defined in claim 13, further comprising:
activating a heating member within the heating pan while preventing incoming water from entering the heating pan to effectively sterilize the water distillation unit.

21. A method of operating a water distillation unit, comprising:
providing an evaporation unit and a heating member within a heating pan to purify incoming water containing contaminants;

inputting water to the heating pan;

activating the heating member within the heating pan to generate steam;

cooling the steam within a condenser unit to form water condensate;

positioning a total dissolved solids probe within the heating pan for measuring total dissolved solids values; and partially flushing water from the heating pan in response to the measured total dissolved solids value to lower the total dissolved solids content of the water in the heating pan.

22. A method as defined in claim 21, wherein the step of partially flushing includes discharging from 3% to 15% of the water within the heating pan.

* * * * *